(12) United States Patent
Gaudiani et al.

(10) Patent No.: US 10,940,404 B1
(45) Date of Patent: Mar. 9, 2021

(54) MODULAR WEIR FOR FLUID SEPARATION APPARATUS AND SYSTEM

(71) Applicant: OSI Environmental LLC, North Royalton, OH (US)

(72) Inventors: Michael A. Gaudiani, Shaker Heights, OH (US); Jeff Mann, Wadsworth, OH (US)

(73) Assignee: OSI Environmental LLC, North Royalton, OH (US)

( * ) Notice: Subject to any disclaimer, the term of this patent is extended or adjusted under 35 U.S.C. 154(b) by 172 days.

(21) Appl. No.: 15/701,018

(22) Filed: Sep. 11, 2017

(51) Int. Cl.
*B01D 17/04* (2006.01)
*B01D 17/02* (2006.01)

(52) U.S. Cl.
CPC ....... *B01D 17/045* (2013.01); *B01D 17/0214* (2013.01)

(58) Field of Classification Search
CPC .......................... B01D 17/045; B01D 17/0214
See application file for complete search history.

(56) References Cited

U.S. PATENT DOCUMENTS

| 1,672,583 | A | * | 6/1928 | Travers | C11B 13/00 |
| | | | | | 210/801 |
| 4,333,835 | A | * | 6/1982 | Lynch | B01D 17/00 |
| | | | | | 210/305 |
| 4,400,274 | A | * | 8/1983 | Protos | B01D 17/00 |
| | | | | | 210/302 |
| 5,454,937 | A | | 10/1995 | Lewandowski | |
| 6,056,128 | A | | 5/2000 | Glasgow | |
| 7,416,657 | B2 | * | 8/2008 | Kretchmar | B01D 17/045 |
| | | | | | 210/95 |
| 2012/0312739 | A1 | * | 12/2012 | Sowerby | B01D 17/0211 |
| | | | | | 210/513 |

* cited by examiner

*Primary Examiner* — Krishnan S Menon
(74) *Attorney, Agent, or Firm* — Hahn Loeser & Parks LLP; Daniel J. Smola (57) ABSTRACT

In an embodiment, a coalescing separator apparatus includes a containment well configured to include a coalescing media an inlet on a first end wall and an outlet on a second end wall; a surface-skimming drain disposed in the containment well; and a modular weir comprising a weir front wall, a weir middle wall, and a weir back wall, each of which are coupled to two opposing weir side walls, a through-hole being disposed in the weir back wall, through which the outlet is disposed. A modular weir and method for quickly replacing, maintaining, or repairing a weir in a coalescing separator apparatus is also described.

29 Claims, 8 Drawing Sheets

MODULAR WEIR FOR FLUID SEPARATION APPARATUS AND SYSTEM

FIELD

This disclosure relates to fluid separators, particularly those used in oil-skimming equipment.

BACKGROUND AND SUMMARY

Coalescing separators are designed to remove oil or other insoluble material from a liquid, usually water. Often the liquid is used as a coolant in machinery, such as, metal cutting machinery. Oil used as lubrication in such machinery becomes mixed with the coolant and often other materials such as metal particulates. In such a state, the mixture is unusable and even difficult to dispose of.

Oil separators such as floating tube skimmers and floating weir skimmers can be used in relatively large bodies such as containment pools or ponds. Many applications are not conducive to such large systems. Coalescing separator units are often used with smaller systems to remove and recycle oil from the coolant liquid. Sometimes the coolant liquid is also recycled.

Coalescing separators sometimes utilize weir mechanisms to separate the layered oil and water portion from a column of water to produce a column of water that does not have the oil layer on top. This may be done by providing two walls: a first taller wall designed to block the oil and water layers from overflowing it and having an opening at the bottom, and a second shorter wall with no opening at the bottom and designed to allow a column of clean water to overflow into a column to be drained from the apparatus. These walls are welded, molded, or otherwise permanently affixed to the coalescing separator apparatus. Because of the spacing of the walls it can be difficult to weld or otherwise attach them to the apparatus.

The articles "a," "an," and "the" should be interpreted to mean "one or more" unless the context clearly indicates the contrary.

SUMMARY

A coalescing separator apparatus includes a containment with a coalescing media therein, an inlet on a first end wall and an outlet on a second end wall on opposite sides of the coalescing media. A surface-skimming drain is disposed in the containment well. A modular weir is also disposed in the containment well and includes a weir front wall, a weir middle wall, and a weir back wall, each of which are coupled to two opposing weir side walls, a through-hole being disposed in the weir back wall, through which the outlet is disposed. A height of the weir front wall is higher than a height of the weir middle wall, the height being determined with reference to a bottom of the modular weir. The weir middle wall extends to a bottom of the modular weir and the front wall does not extend to the bottom of the modular weir, whereby a path is configured for fluid to flow under the weir front wall and over the weir middle wall.

A method for manufacturing a separator apparatus includes the steps of: (a) constructing a containment well configured to hold a fluid and including an end wall with a through-hole; (b) dropping in a modular weir; (c) aligning the through-hole in the modular weir with the through-hole in the second end wall; (d) inserting an outlet through the through-hole in the modular weir with the through-hole in the second end wall; and (e) securing the outlet to the modular weir. The modular weir includes: a weir front wall, a weir middle wall, and a weir back wall, each of which are coupled to two opposing weir side walls, a weir bottom wall that is coupled to bottom edges of the two opposing weir side walls and bottom edges of the weir back wall and the weir middle wall, a through-hole disposed in the weir back wall. A height of the weir front wall is higher than a height of the weir middle wall, the heights being determined with reference to a bottom of the modular weir. The middle wall extends to the weir bottom wall and the weir front wall does not extend to the bottom of the modular weir.

A method for separating a first fluid and a second fluid includes the steps of: (a) flowing a mixture comprising the first fluid and the second fluid into a containment well that comprises a coalescing media; (b) allowing the second fluid to coalesce from the first fluid and form a surface layer of the second fluid; (c) draining at least a portion of the second fluid from the surface layer of the second fluid out of the containment well; (d) flowing the first fluid out of the containment well through an outlet disposed in a modular weir, the modular weir comprising a weir front wall, a weir middle wall, and a weir back wall, each of which are coupled to two opposing weir side walls, a through-hole being disposed in the weir back wall, through which the outlet, wherein the first fluid flows under the weir front wall, then over the weir middle wall, and then out the outlet; and (e) removing the modular weir and replacing the modular weir with a second modular weir of the same or different dimensions.

A modular weir includes a weir front wall, a weir middle wall, and a weir back wall, each of which are coupled to two opposing weir side walls, a weir bottom wall that is coupled to bottom edges of the two opposing weir side walls and bottom edges of the weir back wall and the weir middle wall, a through-hole disposed in the weir back wall. The height of the weir front wall is higher than the height of the weir middle wall, the heights being determined with reference to a bottom of the modular weir. The middle wall extends to the weir bottom wall and the weir front wall does not extend to the bottom of the modular weir.

DETAILED DESCRIPTION

In an embodiment described herein, a modular weir and modular weir utilized in a coalescing separator apparatus for oil skimming is provided. The modular weir has a middle wall that extends to a bottom of the modular weir and a front wall that does not extend to the bottom of the modular weir, whereby a path is configured for fluid to flow under the weir front wall and over the weir middle wall. The modular weir is designed to be used in various sized separator apparatuses to divide the oil and water layered portion from a clean water portion. It is not permanently attached to the walls of the oil separator apparatus, but can be detached and removed or its position can be adjusted. In addition, the weir cartridge may have an additional back wall and bottom wall that are not present in conventional systems that further acts to enclose the clean water portion from the oil and water portion. In such an embodiment, the joints of the weir may be more easily and durably manufactured as the modular weir can be manufactured separately from the containment tank.

In an embodiment, the modular weir can be removed and cleaned without cleaning the entire separator apparatus. When removed from the apparatus the modular weir is easier to clean than one that is affixed to the apparatus and could even be separately machined washed. Cleaning the modular weir may be more important than cleaning other features of the device, as it provides the separation for clean water to exit the apparatus. A clean modular weir can also be immediately swapped into the separator apparatus in place of the dirty modular weir to minimize down time of the apparatus. A set of modular weirs can also have walls of various heights so that a weir height can be changed in an oil separator apparatus by substituting a modular weir of a different height. In this way, the larger oil coalescing apparatus can be customized to a desired fluid level depending on the application by selecting an appropriate modular weir.

In addition, the modular weir can be used in other types of tanks to provide a mechanism to separate a bottom portion from a layered combination of two, three, or more fluids to produce a column or portion that is composed of only the bottom layer. The modular weir can be used with tanks of any dimension, so long as the modular weir is wide enough to cover the outlet. In contrast, in separator tanks with permanently affixed separator weirs, the walls must extend to and be affixed to one or more walls of the tank.

The terms "oil" (lower density fluid) and "water" (higher density fluid) are used throughout to refer to a primary example, but other higher density and lower density fluids can be substituted for these. For example, fluids that are not miscible with another, wherein the lower density fluid rests on top of the higher density fluid when combined in a common container can be separated with apparatuses and methods disclosed herein. Some notable examples of high and low density fluids other than water and oil are machine coolant fluid (similar to antifreeze) and oil, and water and silicone.

Figure 1:
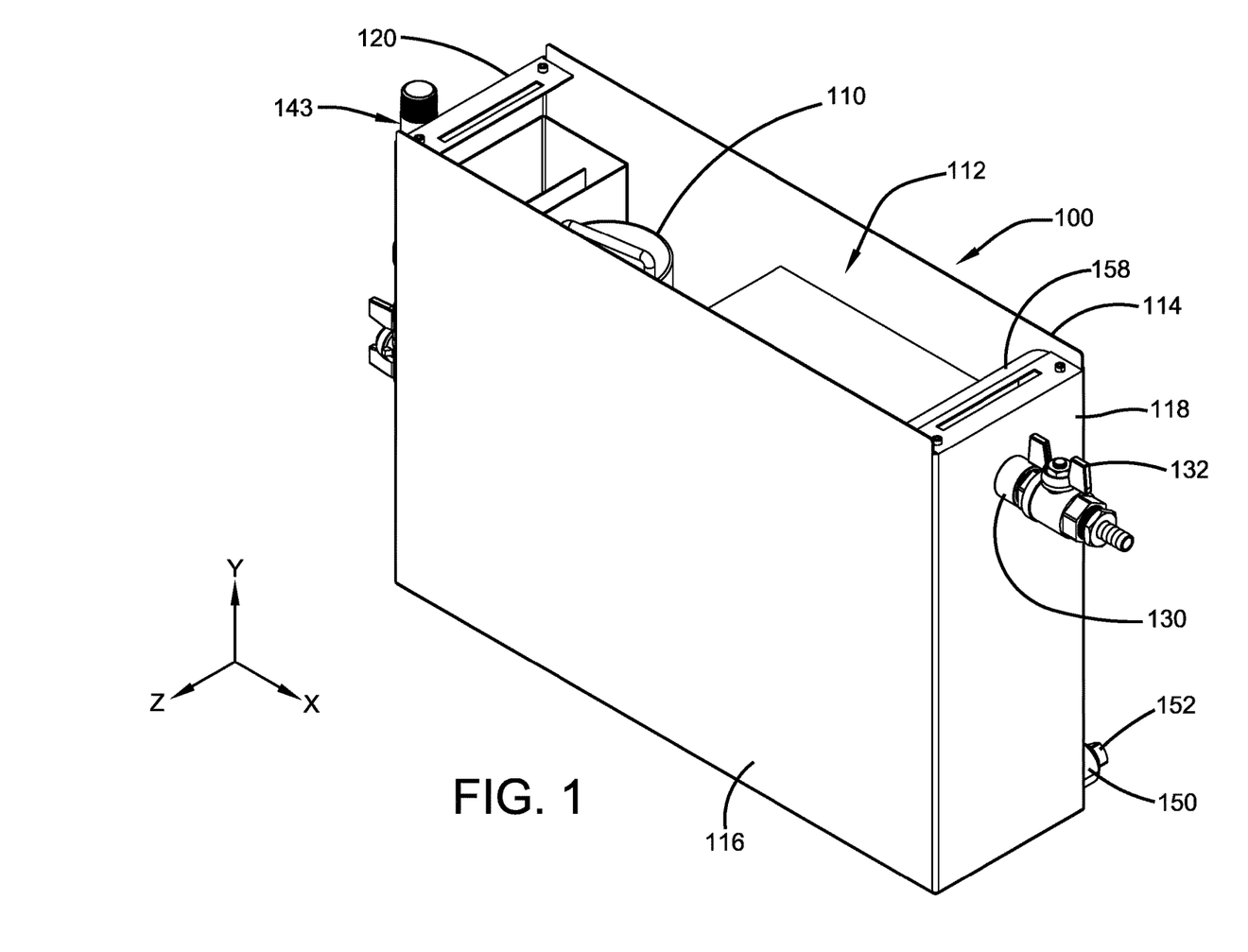
FIG. 1 is a perspective view of an example oil coalescing separator.
Figure 2:
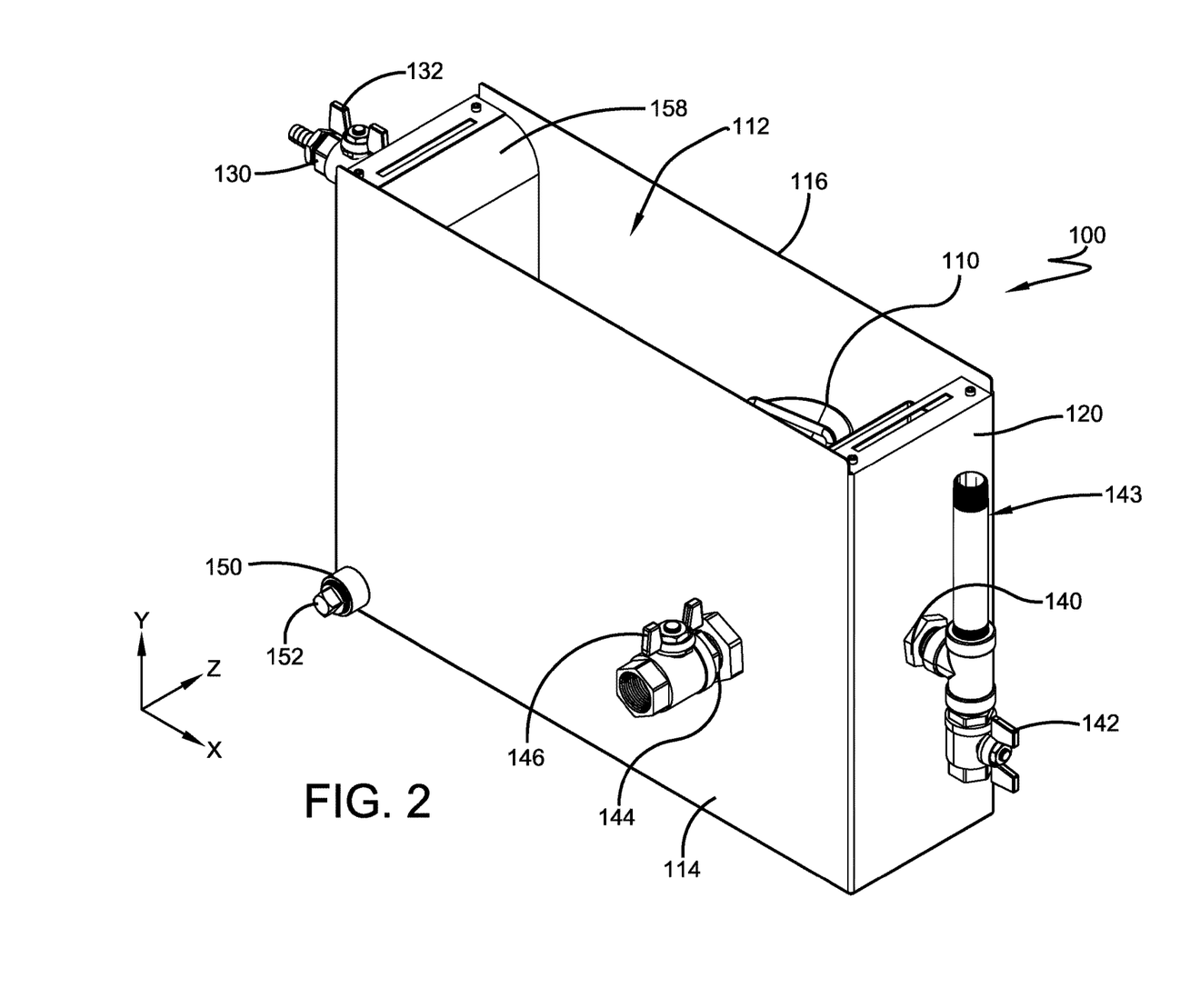
FIG. 2 is a perspective view showing a 180-degree rotation of the example oil coalescing separator of FIG. 1.
Figure 3:
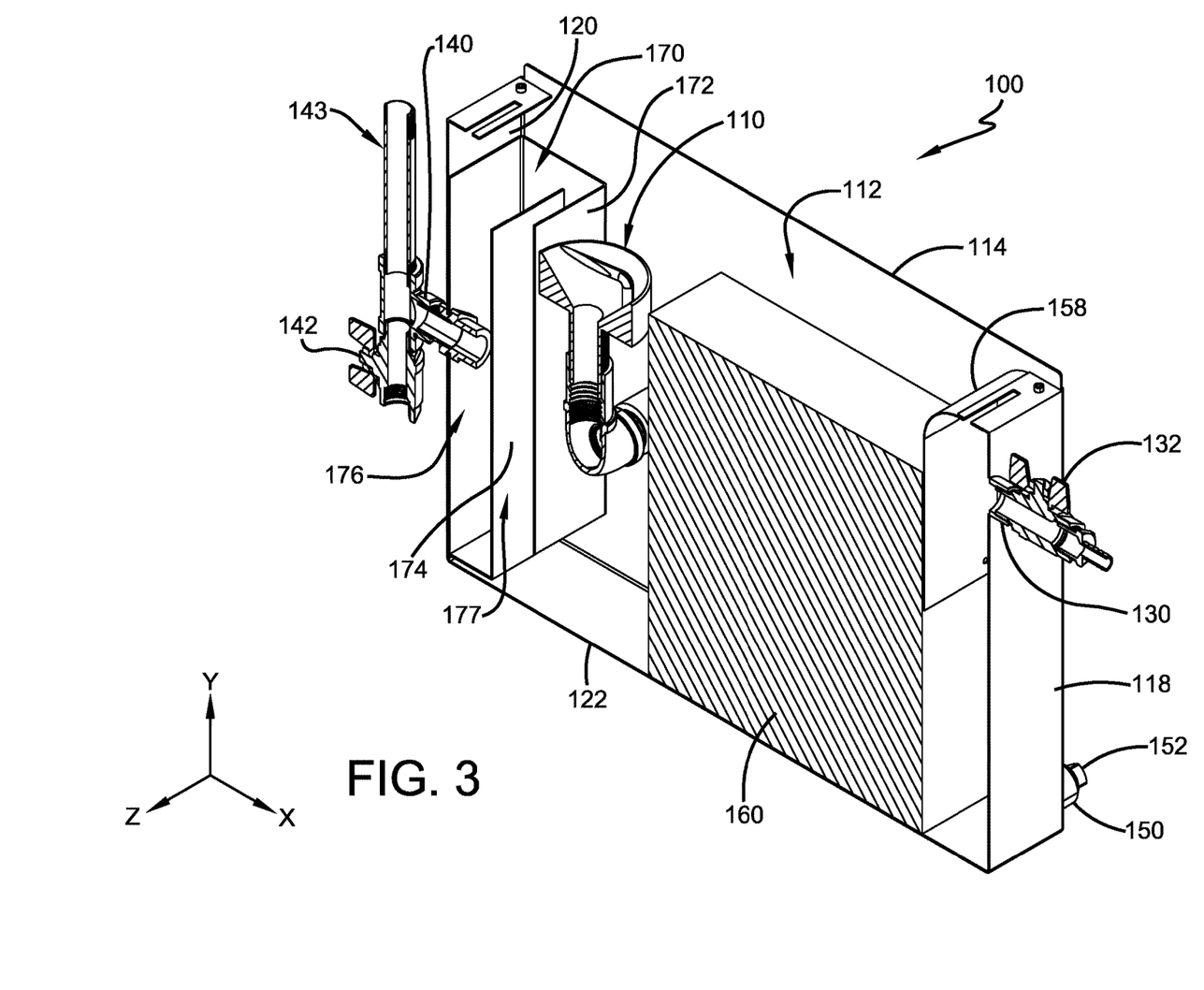
FIG. 3 is an x-axis cut-away perspective view of the example oil coalescing separator of FIG. 2.
Figure 4:
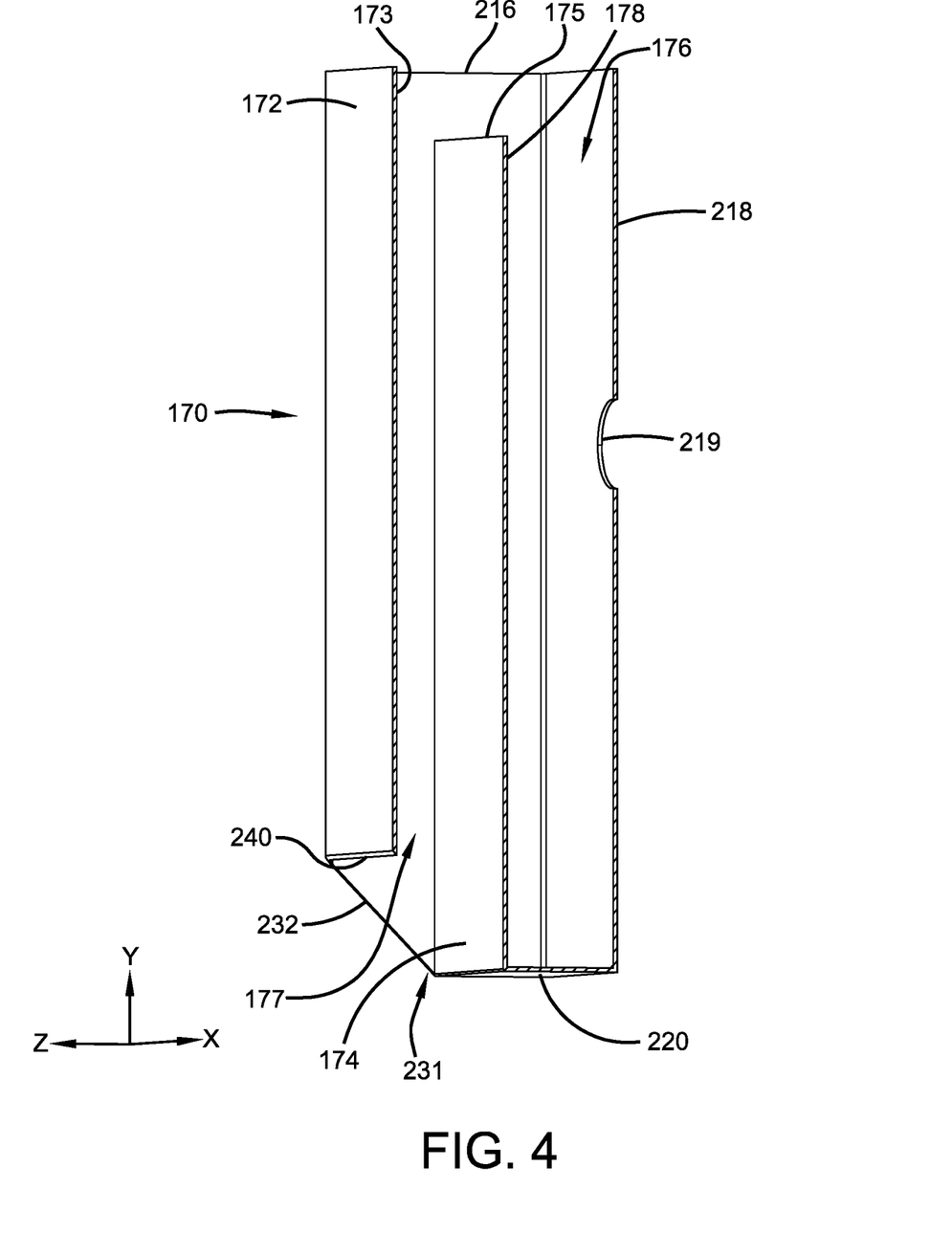
FIG. 4 is a cross-sectional view of an example modular weir.
Figure 5:
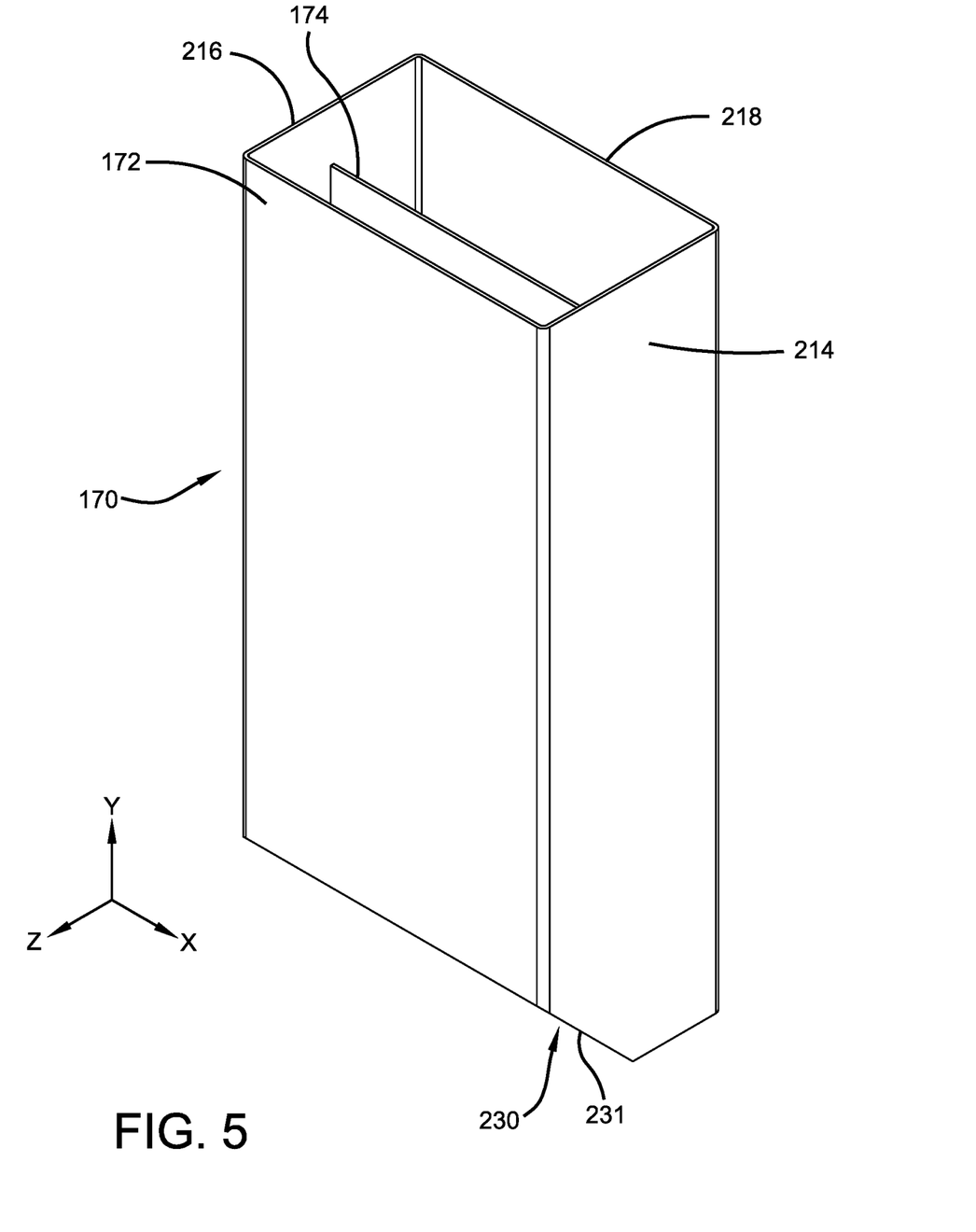
FIG. 5 is a perspective view looking down at the top and sides of the example modular weir.
Figure 6:
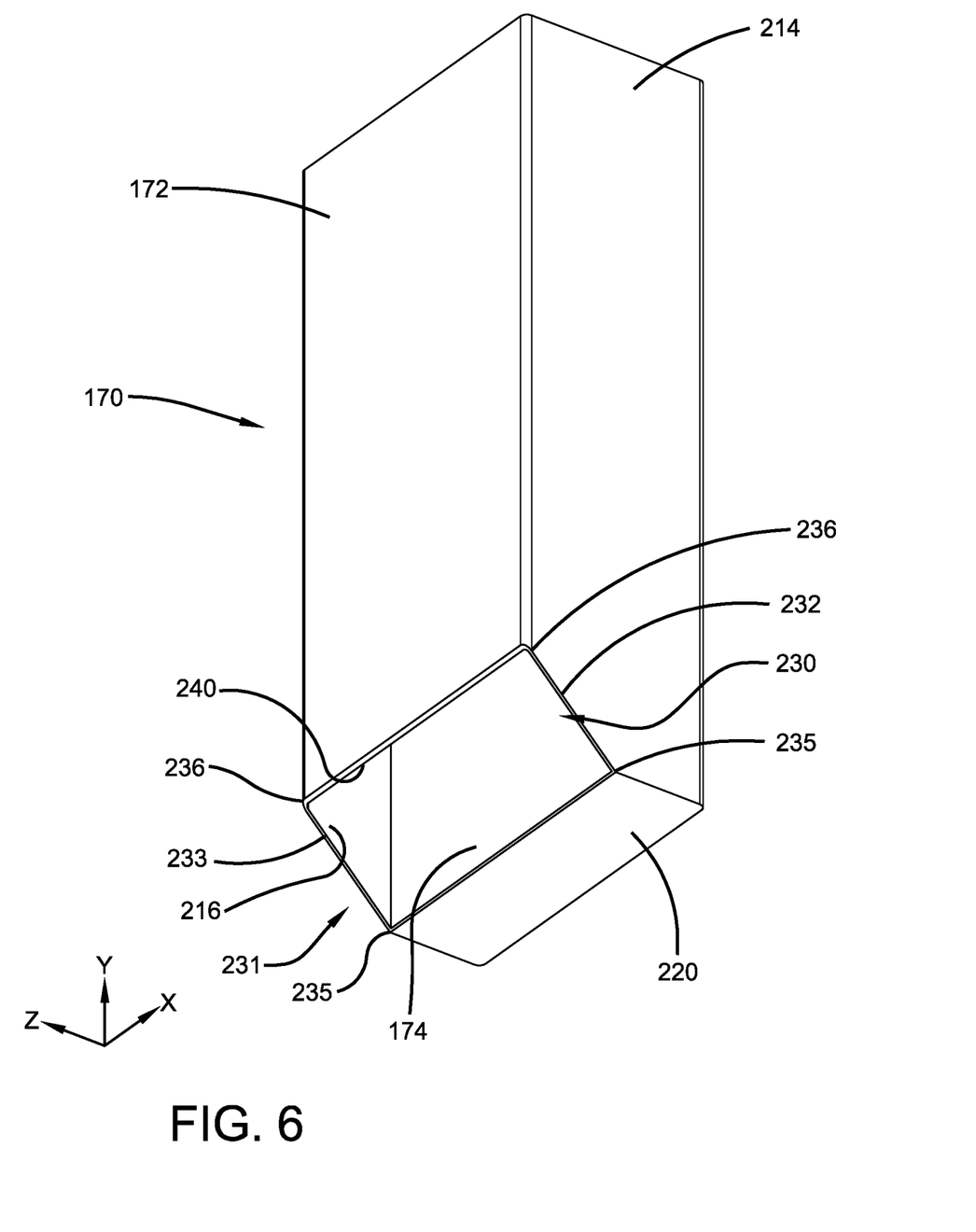
FIG. 6 is a perspective view looking up at the bottom and sides of the example modular weir
Figure 7:
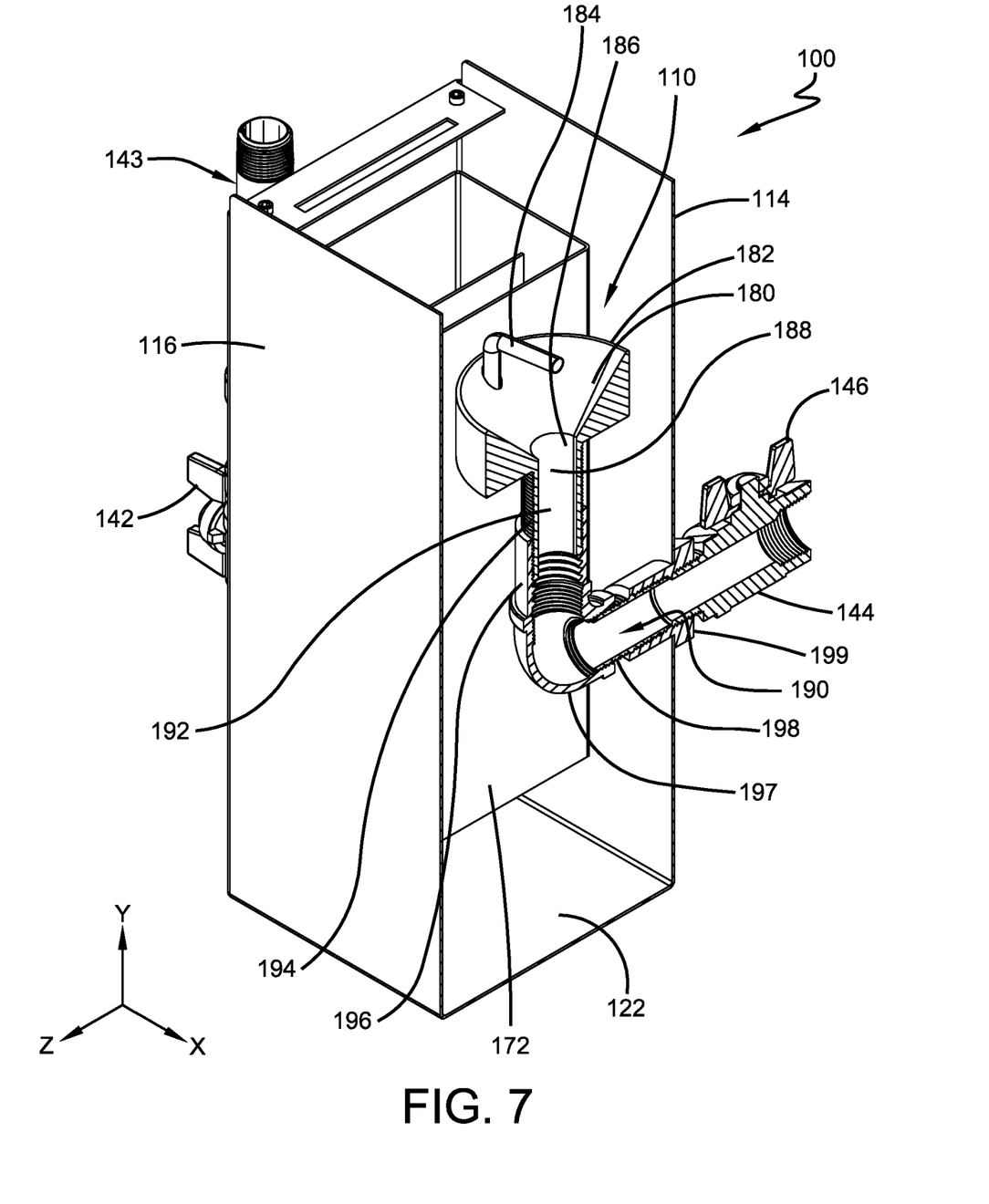
FIG. 7 is a cross-sectional view of an example oil coalescing separator including an example variable height weir in operation.
Figure 8:
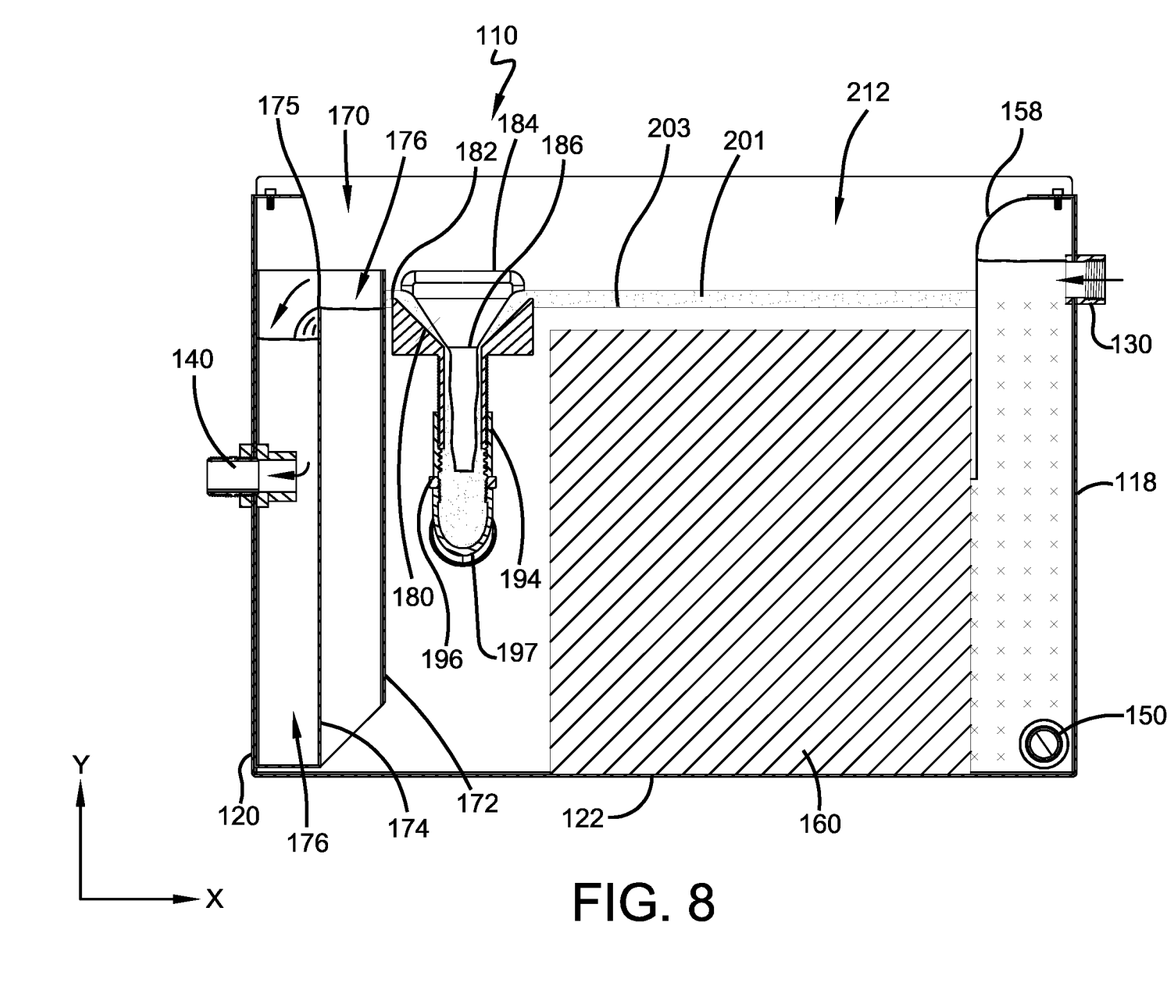
FIG. 8 is a diagram of an example coalescing separator apparatus is operation.

FIGS. 1-3 depict an embodiment of the coalescing separator apparatus 100 in which the modular weir 170 is used. FIGS. 4-6 depict the modular weir 170 in isolated detail. FIG. 7 shows an optional variable-height weir. FIG. 8 shows an embodiment of the system in operation.

The figures show an embodiment of a coalescing separator apparatus 100 that includes an oil outlet (also referred to herein more generally as a surface-skimming drain), that is a variable-height weir 110 for draining or skimming the oil from the top of the coalescing separator apparatus 1000. The variable-height weir 110 is an improvement over prior art devices and is described below and claimed in a concurrently filed application; however, this feature is not a necessary component to be used with the modular weir of the current application. In embodiments, the variable-height weir 110 may be replaced by a prior art fixed weir to skim and remove the oil from the coalescing separator apparatus 100.

In an embodiment with the variable-height weir 110, the height is adjustable to allow a user to operate the coalescing separator apparatus to directly remove a selected level of oil from the top surface of an oil/water mixture. This is in contrast to other separator devices, which only allow an adjustment of the total fluid (oil plus water) level in the entire containment well of the separator. Such devices do not allow fine control of the oil level being removed and also have the potential to disrupt the efficiency of a coalescing unit, by dropping the fluid level so low that part of the coalescing media a exposed to air. Adjusting the total fluid level in prior art solutions also requires either temporarily raising or lowering the inflow or outflow of fluid into the separator containment well and then readjusting it to an equilibrium level. In an embodiment, the apparatus described herein does not require two separate adjustments. As the viscosity and density of oil (or other fluids) differs from application to application, this provides a highly efficient way to finely adjust the level of oil that is removed from the top of the surface.

In an embodiment, the variable-height weir for oil skimming has an upward-facing sloping surface, forming an inlet for the variable weir, wherein the inlet at its outer rim is wider and travels down an upward-facing sloping surface that narrows as it goes down to a channel leading to the oil outlet. By "upward-facing sloping surface" it is meant a non-vertically oriented and non-horizontally oriented surface, or that the surface is visible in a view directly vertical from the surface, but is not completely horizontal. This flow over the upward-facing sloping surface provides the operator a visual indicator of whether the oil being skimmed is (1) high purity oil, in which case a smooth flow will be visually apparent; or (2) a mixture with significant amounts of water, in which case droplets will tend to form on the upward-facing sloping surface.

As shown in FIG. 1, the coalescing separator apparatus 100 comprises a containment well 112 that is bounded by five walls: a first side wall 114, an opposing second side wall 116, a first end wall 118, an opposing second end wall 120, and a bottom wall 122 (see FIG. 3). The five walls are joined together and sealed at the joints to be water and oil tight and form the containment well. Optionally, a top lid (not shown) may rest at the top of the containment well 112. The walls are made of a durable material that is resistant to oil, water, oxidizers, and other potential contaminants. For example, the walls may be made of metal, such as stainless steel and may be welded together at the joints.

The first end wall 118 is coupled to a mixed fluid inlet 130 that is also coupled to a valve 132. In an embodiment, the mixed fluid inlet 130 runs from a larger containment pool where another type of oil separator is running to send dirty or oily water to the coalescing separator apparatus 100. The other type of oil separator may, for example, be a tube skimmer, or a pool surface skimmer. In another embodiment, the mixed fluid may be received into the mixed fluid inlet 130 directly from machinery or a coolant and oil containment pool. In an embodiment, the mixed fluid is pumped by a pump or gravity fed through the mixed fluid inlet 130 into the coalescing separator apparatus 100. In another embodiment, the mixed fluid inlet 130 may recirculate cleaned water from the same or another coalescing separator apparatus 100.

Referring to FIG. 2, which is a view showing a 180-degree rotation about the Y axis of the coalescing separator apparatus 100 from FIG. 1, the second end wall 120 is coupled to a clean water outlet 140, which is also coupled to a clean water outlet valve 142. The clean water outlet 140 is coupled to a stand-pipe 143. The clean water outlet 140 cycles water that has undergone treatment for removal of oil away from the coalescing separator apparatus 100 and back into usage in the machinery or to be safely disposed of. The term "clean water" is used in the sense that the bottom layer fluid has had lower density, immiscible, fluids removed from it through the coalescing and skimming apparatuses. However, this does not necessarily mean that the water or fluid is totally pure.

The stand-pipe 143 is configured to allow for variations in outflow volume, thus promoting continuous flow through the coalescing separator apparatus 100. A surge in fluid flowing through the clean water outlet 140 may rise into the stand-pipe 143, instead of being stopped at the clean water outlet 143 entrance and causing a back up in the coalescing separator apparatus 100.

The embodiment of FIG. 2 has the surface-skimming drain 144 (in this case referred to as an oil outlet 144 since it is discussed in terms of an oil and water mixture) coupled to the first side wall 114. The oil outlet 144 is also coupled to an outlet valve 146. Oil flows from the variable-height weir 110 into the oil outlet 144. The oil outlet 144 may lead to a collection tank (not shown), or, in an embodiment, it may feed directly back into the machinery it was originally used in. In an embodiment, the oil may be reused in the same or different machinery on-site after further purification, or it may be repurposed or disposed of.

A clean-out outlet 150 is also coupled to the bottom corner of the first side wall 114. A plug 152 is inserted in the outlet. The clean-out outlet 150 may be opened and used to remove all the contents of the coalescing separator apparatus 100 to clean it out from time to time. This may be done to replace or adjust the modular weir 170.

Other features inside the containment well 112, including the modular weir 170 are better seen in the cutaway view of FIG. 3. At the front of the coalescing separator apparatus 100 and coupled to the first end wall 118, and, optionally, the first and/or second side walls 114, 116 is an inlet deflector 158. The inlet deflector 158 extends from the first end wall 118 towards the center of the containment well 112 and curves towards the bottom wall 122. The inlet deflector 158 is configured to promote laminar flow into the containment well and prevent splashing and direct the inflow of mixed fluid (e.g., oil and water) from the mixed fluid inlet 130 down to contact the coalescing media 160. A smooth, laminar flow into the containment well 112 promotes the coalescing action.

The coalescing media 160 sits at the bottom of the containment well 112, abutting a portion of the bottom wall 122 and a portion of the inlet deflector 158. The inlet 130 and the clean water outlet 140 are on opposite sides of the coalescing media. The coalescing media 160 is typically a high surface area material and functions to provide a surface for oil droplets to coalesce and grow into large droplets. As the volume of the oil droplet increases the buoyancy of the droplets also increases and the droplets rise to the surface of the mixed fluid. The rate of rise is determined on Stoke's law and the droplets rise so long as the specific gravity of the oil is less than the specific gravity of water or other fluids that may be present in the mixed fluid.

The coalescing media 160, may, for example, be a series of stacked plates, a layered mesh, a porous structure, or a honeycomb-type structure. In an embodiment, the coalescing media 160 is an oleophilic material such as plastic, for example, polyethylene terephthalate (PET), polypropylene, and functional polymers. Carbon-based, porous material may also be used.

In an embodiment, the coalescing media 160 takes up a large percentage of the volume of the containment well 112. For example, the coalescing media 160 may have a volume that is 35% to 90% of the volume of the containment well 112, such as, for example, 55% to 85%, or 65% to 80%. Normally, the oil and water level in the containment well 112 should completely cover the coalescing media 160. In an embodiment, the oil/water interface is also above the coalescing media 160 as this the most efficient level for coalescing the oil. To facilitate this, the level of the oil/water interface can be finely controlled by moving the variable-height weir 110 up or down. If a prior art, not variable-height weir is used instead, then some adjustment of the level can be controlled by adjusting the volume of the in-flow and out-flow.

FIG. 3 also shows the modular weir 170 at the far end of the containment well 112 from the inlet deflector 158. The outlet weir 170 functions to separate the relatively clean water underneath the top oil layer. The modular weir 170 comprises a weir front wall 172 that has a height that is above the highest level that the variable-height weir 110 can be adjusted to. In an embodiment, the height of the weir front wall 172 may reach the height of the side walls and end walls 114, 116, 118, and 120 of the containment well 112. The weir front wall 172 does not extend to the bottom wall 122 of the containment well 112 or to the bottom of the weir middle wall 174, but rather defines a passage between the bottom wall 122 of the containment well 112 and the two weir side walls 214, 216 for clean water to flow past and underneath the front wall 172. The front wall 172 serves to block the oil layer near the top of the containment well 112, while allowing the lower water layer to flow through behind the front wall 172.

As is better seen in FIGS. 4-6, the two weir side walls 214, 216 of the modular weir 170 are joined to the front wall 172, middle wall 174, and weir back wall 218 which extend vertically along the two weir side walls 214, 216. In addition, a weir bottom wall 220 extends horizontally along the bottom of the modular weir 170 and is joined to the bottom edges of the two weir side walls 214, 216 and the weir back wall 218. The weir bottom wall 220 is not joined to the weir front wall 172. The weir bottom wall 220, advantageously allows for removal of the modular weir 170 and replacement with another modular weir of the same or different dimensions that does not allow any particulate contaminant resting at or near the bottom of the containment 112 to enter the clean water channel 176. The replacement or second modular weir may have one or more dimensions that vary between 10% to 500% of one or more dimensions of the first modular weir 170, such as 50% to 200%, or 75% to 150%.

In an embodiment, one or both of the two weir side walls 214, 216 have a cut-away portion 230, 231 at a bottom corner edge 232, 233 that deviates from a rectangular profile to allow for in-flow of clean water into the column 177 from the side. Generally, between the weir middle wall 174 and the weir front wall 172, the bottom corner edge 232, 233 of the opposing side walls 214, 216 extend upward and toward the weir front wall 172 and intersect and join with respective corners of the bottom edge 240 of the weir front wall 172. As shown in FIGS. 4-6, the bottom corner edges 231, 233 extend diagonally from the junction 235 of the weir side walls 214, 216 and the bottom of the weir middle wall 174 to the junction 236 with the weir front wall 172. By "short-cutting" this bottom corner edge 231, 233 this provides a wider mouth for the channel 177 and allows water to enter the channel 177 even if a substantial amount of particulate matter gathers at the front of the modular weir 170. This is particularly beneficial if the width of the weir front wall 172 is less than an interior width of the containment well 112, such as 5% or more smaller, 7% to 75% smaller, or 10% to 50% smaller.

The modular weir 170 also includes a weir middle wall 174 that extends to and is joined to the weir bottom wall 220, but extends to a height that is lower than the height of the weir front wall 172. In an embodiment, the height of the weir middle wall 174 is fixed relative to the modular weir, i.e., the other components of the modular weir 170. In another embodiment, the height of the weir middle wall 174 or a portion of the weir middle wall 174 is adjustable. In an embodiment, in normal operation, the height of the middle wall 174 is slightly below the height of the variable-height weir 110 or slightly below a fixed weir used in place of a variable height weir 110. The height is determined with reference to a bottom wall of the containment well 122 when the modular weir 170 is inserted in the coalescing separator apparatus 100. The modular weir 170 is intended and configured to be placed at the bottom of the containment well 112, but can in some instances be secured above the bottom of the containment well 112. If the modular weir 170 is separately considered outside of the containment well 112 or is not at the bottom of the containment well 112, the height of its various walls is determined with reference to the weir bottom wall 220.

In an embodiment, the weir front wall 172, the weir back wall 218, and the weir sidewalls 214, 216 extend to the same height, which is typically the full height of the modular weir 170. In an embodiment, the bottom edge 240 of the weir front wall 172 is at 3 to 35% the total height of the modular weir 170, such as, for example, 5% to 30%, or 10% to 25%. In other words, an open space between the bottom edge 240 of the weir front wall 172 and bottom wall 122 of the containment well 112 (if the modular weir 170 is set in a containment well 112) is 3 to 35% the total height of the modular weir 170, or 5% to 30%, or 10% to 25%. In an embodiment, the weir middle wall 174 extends from the bottom wall 220 of the modular weir 170 to 65% to 97% of the total height of the modular weir, such as 70% to 95%, or 75% to 90%. In an embodiment, the bottom wall extends from the weir back wall 218 and ends at the weir middle wall 174.

The back side 173 of the weir front wall 172 and the weir middle wall 174 define a column 177 in which clean water enters and rises, and during normal operation the clean water will flow over the top edge 175 of the middle wall 174 into a clean water outlet compartment 176 that is bounded in part by the back side 178 of the middle wall 174 and the weir back wall 218. The first and second weir side walls 214, 216, also serves as a boundary to the clean water outlet compartment 176. The clean water outlet compartment 176 thus separates the clean water outlet 140 from the rest of the contents of the containment well 112.

As seen in FIG. 4, the weir back wall 218 includes a through-hole 219 that is configured to fit the clean water outlet 140. As shown in FIG. 3, the clean water outlet 140 extends through the second end wall 120 of the containment well 112 and through the through-hole 219 in the modular weir 170. Though not shown in explicit detail, the clean water outlet 140 may comprise a pipe extending through the second end wall 120 of the containment well 112 and through the through-hole 219 in the modular weir 170 with seals and fittings on both ends that can be tightened to insure a secure water tight fit. The fittings may be a releasable securing mechanism, such as a threadedly engaged nut or other structure that is screwed onto a threaded receiver on the clean water outlet 140 on the interior of the modular weir 170.

By forcing water to flow under the weir front wall 172 and then rising to flow over the weir middle wall 174, not only oil, which is primarily coalesced into the top surface layer, but also heavy particulates and other materials are removed (typically by settling to the bottom) from the water that flows into the clean water compartment 176.

FIG. 7 shows an isolated cut-away of the variable-height weir 110, which is useable in certain embodiments of the present technology disclosed herein, and can alternately be a fixed height drain or weir that is not adjustable. The variable-height weir 110 has an upward-facing sloping surface 180 that is funnel-shaped. The upward-facing surface 180 may, for example, have an angle of incline (wherein 0 degrees is defined as vertical (y-axis) and 90 degrees is defined as horizontal (x- and z-axis)) of 10 degrees to 85 degrees, such as 20 degrees to 60 degrees or 25 degrees to 45 degrees. As described above, this sloping surface provides visibility for the oil that is draining from the top of the surface of the oil and water in the containment well 112. The upward-facing sloping surface 180 has a top edge 182 that is circular and circumscribes the top of the variable-height weir 110. Other embodiments may have different geometries other than a funnel, such as, for example, inverted pyramidal or an oval or irregular shaped rimmed funnel. In an embodiment, the top edge 182 has the same height around the entire circumference.

The bottom edge 186 of the upward-facing sloping surface 180 circumscribes a vertical drain hole 188, which is coupled to an interior channel 190 that is coupled to and exits the coalescing separator apparatus 100 at the oil outlet 144. Various pipes and connectors define the channel 190 and are coupled to the oil outlet 144. The height of the oil outlet in the containment well 112 is not adjustable. The height of the variable-height weir, when set to a fixed position, has a height that is fixed in relation to the fluid level and a height that is fixed in relation to the containment well.

The variable-height weir 110 includes a vertical shaft 192 that on the interior defines a portion of the channel 190 and on the exterior comprises an inclined continuous helical thread 194 around its circumference that is threadedly engaged to a threaded receiver 196. In this embodiment, the threaded receiver 196 is connected to an elbow joint 197 that is connected to a straight pipe 198 that is connected to the oil outlet 144, but other connectors could also be used. A sealing ring 199 fits over the straight pipe 198 and connects to the first side wall 114, sealing the containment well 112. The oil outlet 144 is also connected to the sealing ring 199. Rubber gaskets and seals may be used as needed or desired for any of the outlets, inlets, or junctions to, from, and within the containment well 112.

In an embodiment comprising the variable-height weir 110, the variable-height weir 110 is configured to be vertically movable and set to a position between a minimum height and a maximum height, the height being determined with reference to a bottom wall 122 of the containment well 112. In normal efficient operation the variable-height weir 110 will be adjusted to a level slightly above the height of the weir middle wall 174. The depth of the skimming of oil from the top of the surface can be controlled by raising or lowering the variable-height weir 110. If the operator wishes to stop the draining of oil and accumulate a greater volume and taller surface layer of oil, the variable-height weir 110 can be raised above the level of the top fluid surface. When the surface layer is thicker, this also insures a higher purity of oil flowing through the oil outlet 144, which may be desirable in some situations. A maximum height of the variable-height weir 110 should not exceed the height of the weir front wall 172. Normally, the variable-height weir 110 has a minimum height no lower than the top of the coalescing media 160. Optionally, a clear window may be disposed one or more side walls 114, 116, in-line with the variable height weir 110, so that it is configured to show the thickness of the oil and water layers.

By rotating the variable-height weir 110, the height of the variable-height weir 110 will go up or down as the threads recede into the threaded receiver 196 or rotate out of the threaded receiver 196. Thus, the operator can adjust the height to a level desired for achieving the desired level of skimming from the top of the surface of the oil water mixture contained in the containment well 112. In other embodiments, another rotary type mechanism may be used to adjust the height of the variable-height weir 110. In yet other embodiments linear or other adjustment mechanisms may, for example, be used to raise or lower the variable-height weir 110 to a desired level.

In an embodiment, the variable-height weir 110 further comprises a handle 184 that extends from one side of the variable-height weir 110 to the other and spans over the drain hole 188. The handle 184 provides a useful way to rotate the variable-height weir 110 without the user having to touch the oily surface of the oil and water mixture. In an embodiment, the upward-facing sloping surface 180 is substantially uncovered (except for the unobtrusive handle 184) and open to view by the operator. In an embodiment, at least a portion of the upward facing surface 180 is uncovered from a top-down view, so that an operator can view the upward-facing sloping surface 180 from above the oil/water surface. This enables the operator to visually determine the desired level of oil skimming from the surface.

In an embodiment, the inlet is configured to be open to allow about the same fluid volume to pass through as the outlet in combination with the oil outlet, so that a fluid level in the containment well is substantially constant. Substantially constant means not interfering with the efficient operation of the apparatus. The fluid level, may for example, stay within 10%, 5%, or 1% of a baseline level over a ten-minute interval.

FIG. 7 is a cross-sectional view of an example coalescing separator apparatus 100 including an optional variable-height weir 110 in operation. In an embodiment, a method of separating oil from water (or any other set of fluids that are immiscible) comprises the steps of flowing a first and second fluid (e.g., oil and water) mixture from a mixed fluid inlet 130 into a containment well 112. The inflowing fluid mixture may be pumped or gravimetrically fed through pipes or tubes coupled to the inlet mixed-fluid 130. The oil and water mixture contacts a coalescing media 160 in the containment well 112, this causes the oil to coalesce from the water and form into droplets that rise to the surface and form an oil layer 201. The separated water flows under the weir front wall 174 of the modular weir 170, filling up the area between the weir front wall 172 and the weir middle wall 174 and flowing over the top edge 175 of the weir middle wall 174 into the clean water compartment 176. The water then flows out of the clean water outlet 140. Often the mixture of oil and water contains heavy particulates, such as metal shavings that will settle to the bottom wall 122 of the containment unit 112.

The operator adjusts the variable-height weir 110 to a certain level to remove the desired level of oil from the oil layer 201 by draining at least a portion of the oil from the surface layer of oil through the variable-height weir 110. The oil flows through the variable-height weir 110 through the channel 190 and out of the containment well 112.

In an embodiment, the desired level may be at just above the oil/water interface, or just below the oil/water interface 203, such as, for example, from within 1 inch above or below the oil/water interface 203, within 0.1 inches above or below the oil/water interface 203, or within 0.01 inches above or below the oil/water interface 203.

In another embodiment, the level is adjusted to above the oil/water interface 203, such as 0.01 inches to 10 inches above the oil/water interface 203, 0.1 inches to 6 inches above the oil/water interface 203, or 1 inch to 2 inches above the oil/water interface 203. This may be useful in a mixture where different viscosities of oil or different types of immiscible fluid are present and the operator wishes to only drain off one level, and perhaps drain the second level after switching the container coupled to the oil outlet 144.

In another embodiment, the level is adjusted to below the oil water interface 203, such as 0.01 inches to 10 inches below the oil/water interface 203, 0.1 inches to 6 inches below the oil/water interface 203, or 1 inch to 2 inches below the oil/water interface 203. This may be useful when the operator is seeking to ensure that as much oil as possible is removed from the water even if the removed oil includes some water content.

In an embodiment the operator visually determines the proper adjustment by viewing the oil flow on the upward-facing sloping surface 180. Water droplets may form on the upward-facing sloping surface 180, indicating that the variable-height weir 110 is skimming water and oil, which may indicate to the operator that the height needs to be adjusted.

In an embodiment, the operation of oil skimming can be halted by raising the variable-height weir 110 above the height of the middle wall 175 of the modular weir 170. When this is done, no oil or water will drain through the variable-height weir 110. This may be done when there is no visible layer of oil to skim from the surface, allowing the system to continue to flow efficiently, e.g., without shutting down pumps or adjusting other mechanisms. Eventually, if inflowing water contains oil, the oil layer thickness will increase as clean water continues to flow over the middle wall 175 and into the clean water outlet compartment 176. If the oil layer does not begin draining through the variable-height weir 110 as a result of its lower density allowing its level to rise higher than a pure water level, the operator can adjust the variable-height weir 110 down, so that the oil layer or a portion thereof is skimmed and drained.

In another embodiment, the oil outlet (surface-skimming drain) has a non-adjustable height and the operator can rely on opening or closing the outlet valve 146 to control the fluid level.

In operation, if an operator desires to change a fluid height of a coalescing separator apparatus 100 on a more permanent basis a modular weir with a different weir middle wall 174 height can be swapped out for the existing modular weir. In addition, the modular weir 170 can be swapped out if an operator desires to change another parameter of the coalescing separator apparatus 100 controlled by the modular weir 170, such as, for example, the clearance from the bottom edge of the weir front wall 174 to the bottom wall 122 of the containment well 112 to remedy particulates blocking the opening to the channel 177, or a height of the weir front wall 174 to prevent overflow of the oil layer into the channel 177.

It may also be desirable to swap the modular weir 170 as part of routine maintenance or cleaning, to reduce downtime of the apparatus.

Furthermore, with a modular weir 170, manufacturing various coalescing separator apparatuses 100 of different sizes and specifications is more easily achievable. The containment well 112 of different sizes can be combined with a modular weir 170 of one size. Alternatively, a modular weir 170 of a single size can be combined with containment well 112 of various sizes. In some embodiments the modular weir 170 can be placed in a containment well 112 that has much larger dimensions. For example, so long as the modular weir 170 has a weir bottom wall 220, the modular weir 170 need not reach the bottom wall 122 of the containment well 112. Welding or otherwise attaching the walls of the modular weir 170 is more easily done with the modular weir 170. Thus, use of the modular weir 170 may be advantageous for many embodiments or separating apparatuses with containment wells of various configurations, not just coalescing separators.

In an embodiment, a method of manufacturing includes constructing a containment well configured to hold a fluid that includes at least an end wall with a through-hole. In some embodiments this containment well will be about the same width and slightly deeper (e.g. 5 to 20% deeper) than the modular weir 170, in other embodiments, the containment well can be larger in the width and height (e.g., 1.1 to 20 times larger, such as 1.5 to 10, or 2 5 times larger) than the modular weir 170. The method further includes dropping the modular weir 170 into the containment well. The modular weir 170 also includes a through-hole 219 and the method includes aligning the through-hole 219 in the modular weir 170 with the through-hole in the second end wall. An outlet, e.g., a clean water outlet, is inserted through the through-hole in the modular weir 170 and the through-hole in the second end wall, and the outlet is secured to the modular weir and the end wall of the containment well. The outlet may be secured by a fastener, on either side of the through-hole in the modular weir 170 and/or either side of the through-hole in the end wall. The fastener may be a tight-fitting threaded ring, through which the outlet fits, and the outlet has matching threads, optionally with seals or gaskets also fitting between the ring and the respective wall.

In an embodiment, the modular weir may be spaced away from the end wall, such as by securing the modular weir 170 to the outlet, wherein the outlet is elongated within the containment well extending into the containment well a distance such as 0.5 inches to 30 feet, such as 3 to 50 inches, or 10 to 25 inches. In this embodiment, the outlet should be secured on both ends of each of the two through-holes. Such a configuration allows for different configurations of components in the containment well, and may allow for larger coalescing media.

Swapping out the modular weir 170 can be done by draining the fluid from the containment well 112. Then loosening and/or removing the tensioning device, such as the nut on the end of the pipe that is part of the outlet 140 and extends into the containment well 112, may be done. The pipe is then removed from the through-hole 219 allowing the modular weir 170 to be lifted out of the containment well 112. A new modular weir 170 with one or more different dimensions is then dropped into place, the pipe is inserted, and tightened and sealed, which also secures the modular weir 170 to the second end wall 120 of the containment well 112.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner such as the term "comprising." The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

It is claimed:

1. A coalescing separator apparatus comprising:
    a containment well configured to include a coalescing media therein;
    an inlet on a first end wall and an outlet on a second end wall on opposite sides of the coalescing media;
    a surface-skimming drain disposed in the containment well; and
    a removable modular weir comprising a weir front wall, a weir middle wall, and a weir back wall, each of which are coupled to two opposing weir side walls, where one or both of the two opposing weir side walls have a cut-away portion, a through-hole being disposed in the weir back wall, through which the outlet is disposed;
    a height of the weir front wall is higher than a height of the weir middle wall, the heights being determined with reference to a bottom of the modular weir;
    the weir middle wall extends to a bottom of the modular weir and the front wall does not extend to the bottom of the modular weir, whereby a path is configured for fluid to flow under the weir front wall and over the weir middle wall.

2. The coalescing separator apparatus of claim 1, wherein the modular weir further comprises a weir bottom wall that is coupled to bottom edges of the two opposing weir side walls and bottom edges of the weir back wall and the weir middle wall.

3. The coalescing separator apparatus of claim 1, wherein the outlet is disposed in a through-hole in the second end wall.

4. The coalescing separator apparatus of claim 1, wherein the outlet is lower than the inlet.

5. The coalescing separator apparatus of claim 1, wherein the outlet is secured by a releasable mechanism and is sealed water-tight.

6. The coalescing separator apparatus of claim 5, wherein the releasable mechanism is located on an interior of the modular weir.

7. The coalescing separator apparatus of claim 6, wherein the releasable mechanism is threadedly engaged to a threaded receiver on the outlet.

8. The coalescing separator apparatus of claim 1, wherein the height of the middle wall of the modular weir is fixed relative to the modular weir.

9. The coalescing separator apparatus of claim 1, wherein the weir middle wall is configured to be lower than a height of the surface-skimming drain.

10. The coalescing separator apparatus of claim 1, wherein the inlet is configured to be open to allow about the same fluid volume to pass through as the outlet in combination with the surface-skimming drain, so that a fluid level in the containment well is substantially constant.

11. The coalescing separator apparatus of claim 1, wherein a width of the weir front wall is 5% or more smaller than a width of an interior dimension of the containment well.

12. A method for manufacturing a separator apparatus comprising:
constructing a containment well configured to hold a fluid, and including an end wall with a throughhole;
dropping in a removable modular weir, the modular weir including:
a weir front wall, a weir middle wall, and a weir back wall, each of which are coupled to two opposing weir side walls, where one or both of the two opposing weir side walls have a cut-away portion, a weir bottom wall that is coupled to bottom edges of the two opposing weir side walls and bottom edges of the weir back wall and the weir middle wall, a through-hole disposed in the weir back wall;
a height of the weir front wall is higher than a height of the weir middle wall, the heights being determined with reference to a bottom of the modular weir;
the middle wall extends to the weir bottom wall and the weir front wall does not extend to the bottom of the modular weir;
aligning the through-hole in the modular weir with the through-hole in the second end wall;
inserting an outlet through the through-hole in the modular weir with the through-hole in the second end wall; and
securing the outlet to the modular weir.

13. The method of claim 12, wherein the modular weir is spaced away from the end wall.

14. A method for separating a first fluid and a second fluid:
flowing a mixture comprising the first fluid and the second fluid into a containment well that comprises a coalescing media;
allowing the second fluid to coalesce from the first fluid and form a surface layer of the second fluid;
draining at least a portion of the second fluid from the surface layer of the second fluid out of the containment well;
flowing the first fluid out of the containment well through an outlet disposed in a removable modular weir, the modular weir comprising a weir front wall, a weir middle wall, and a weir back wall, each of which are coupled to two opposing weir side walls, where one or both of the two opposing weir side walls have a cut-away portion, a through-hole being disposed in the weir back wall, through which the outlet, wherein the first fluid flows under the weir front wall, then over the weir middle wall, and then out the outlet; and
removing the modular weir and replacing the modular weir with a second modular weir of the same or different dimensions.

15. The method of claim 14, wherein the containment well is drained of the first and second fluid prior to removing the modular weir.

16. A removable modular weir comprising:
a weir front wall, a weir middle wall, and a weir back wall, each of which are coupled to two opposing weir side walls, a weir bottom wall that is coupled to bottom edges of the two opposing weir side walls and bottom edges of the weir back wall and the weir middle wall, a through-hole disposed in the weir back wall;
a height of the weir front wall is higher than a height of the weir middle wall, the heights being determined with reference to a bottom of the modular weir;
the middle wall extends to the weir bottom wall and the weir front wall does not extend to the bottom of the modular weir, where one or both of the two opposing weir side walls have a cut-away portion.

17. The modular weir of claim 16 wherein the weir bottom wall extends from the weir back wall and ends at the weir middle wall.

18. The modular weir of claim 16 wherein between the weir middle wall and the weir front wall, a bottom corner edge of the opposing side walls extends upward and toward the weir front wall and intersects and joins with respective bottom corners of the bottom edge of the weir front wall.

19. The modular weir of claim 16, wherein the weir front wall extends to a top of the modular weir but the bottom edge of the weir front wall is at 3 to 35% of a total height of the modular weir.

20. The modular weir of claim 16, wherein the weir middle wall extends from the bottom wall of the modular weir to 65% to 97% of a total height of the modular weir.

21. The coalescing separator apparatus of claim 1, where the through-hole in the weir back wall is aligned with a through hole in the second end wall.

22. The modular weir of claim 16, wherein the modular weir is arranged in a containment well, where the through hole in the weir back wall is arranged to align with a through hole in a second end wall of the containment well.

23. The coalescing separator apparatus of claim 21, the outlet being further disposed through the through-hole in the second end wall and secured by a releasable mechanism.

24. The coalescing separator apparatus of claim 1, where the modular weir has a weir bottom wall, the modular weir being disposed in the containment well so that the bottom of the modular weir does not reach a bottom wall of the containment well.

25. The modular weir of claim 16, where the modular weir is arranged within a containment well so that the bottom of the modular weir does not reach a bottom wall of the containment well.

26. The coalescing separator apparatus of claim 1, where the modular weir is spaced away from the second wall of the containment well.

27. The modular weir of claim 16, where the modular weir is arranged within a containment well so that the modular weir is spaced away from a second end wall of the containment well.

28. The coalescing separator apparatus of claim 1, wherein a width of the modular weir is less than a width of an interior dimension of the containment well.

29. The modular weir of claim 16, wherein the modular weir is arranged within a containment well, and where a width of the modular weir is less than a width of an interior dimension of the containment well.

* * * * *